(12) United States Patent
Lin et al.

(10) Patent No.: US 11,042,542 B2
(45) Date of Patent: Jun. 22, 2021

(54) METHOD AND APPARATUS FOR PROVIDING AGGREGATE RESULT OF QUESTION-AND-ANSWER INFORMATION

(71) Applicant: BEIJING BAIDU NETCOM SCIENCE AND TECHNOLOGY CO., LTD., Beijing (CN)

(72) Inventors: Yiming Lin, Beijing (CN); Hui Guo, Beijing (CN); Xiangying Dai, Beijing (CN); Yu Luo, Beijing (CN); Liang Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 308 days.

(21) Appl. No.: 16/215,423

(22) Filed: Dec. 10, 2018

(65) Prior Publication Data

US 2019/0251087 A1    Aug. 15, 2019

(30) Foreign Application Priority Data

Nov. 28, 2017   (CN) .......................... 201711215650.8

(51) Int. Cl.
*G06F 16/2452*   (2019.01)
*G06F 16/28*     (2019.01)
*G06F 16/953*    (2019.01)
*G06F 16/2457*   (2019.01)

(52) U.S. Cl.
CPC .. *G06F 16/24522* (2019.01); *G06F 16/24578* (2019.01); *G06F 16/285* (2019.01); *G06F 16/953* (2019.01)

(58) Field of Classification Search
CPC .... G06F 40/35; G06F 16/24522; G06Q 10/10
See application file for complete search history.

(56) References Cited

U.S. PATENT DOCUMENTS

| 2008/0104065 A1* | 5/2008 | Agarwal | ................ G06Q 10/10 |
| 2017/0249309 A1* | 8/2017 | Sarikaya | ................ G06F 40/35 |

* cited by examiner

*Primary Examiner* — Etienne P Leroux
(74) *Attorney, Agent, or Firm* — Lathrop GPM LLP

(57) ABSTRACT

A method and apparatus for providing an aggregate result of question-and-answer information are provided. An embodiment of the method includes: acquiring a search expression inputted by a user, and determining an entity corresponding to the search expression; and pushing aggregate information corresponding to the entity to the user. The aggregate information includes: a question-answer pair corresponding to each tag of the entity. When the user searches for information on a given aspect of the entity, the aggregate information containing question-answer pairs on a plurality of aspects of the entity is pushed to the user. Thus, the user may acquire information on the plurality of aspects of the entity.

9 Claims, 6 Drawing Sheets

METHOD AND APPARATUS FOR PROVIDING AGGREGATE RESULT OF QUESTION-AND-ANSWER INFORMATION

CROSS-REFERENCE TO RELATED APPLICATIONS

This application claims priority to Chinese Patent Application no. 201711215650.8, filed in China on Nov. 28, 2017, the content of which is incorporated herein by reference in its entirety.

TECHNICAL FIELD

The present disclosure relates to the field of Internet, specifically to the search field, and more specifically to a method and apparatus for providing an aggregate result of question-and-answer information.

BACKGROUND

When a user searches for information on an aspect of an entity, a search expression inputted by the user is usually a question related to the aspect of the entity. At present, some search engines return links of pages containing an answer relating to the question related to the aspect of the entity inputted by the user to the user. The user needs to click the link to jump to the corresponding page, and then find the relevant answer from the page.

SUMMARY

Embodiments of the present disclosure provide a method and apparatus for providing an aggregate result of question-and-answer information.

In a first aspect, the present disclosure provides a method for providing an aggregate result of question-and-answer information. The method includes: acquiring a search expression inputted by a user, and determining an entity corresponding to the search expression; and pushing aggregate information corresponding to the entity to the user, the aggregate information including: a question-answer pair corresponding to each tag of the entity.

In a second aspect, the present disclosure provides an apparatus for providing an aggregate result of question-and-answer information. The apparatus includes: a processing unit, configured to acquire a search expression inputted by a user, and determine an entity corresponding to the search expression; and a pushing unit, configured to push aggregate information corresponding to the entity to the user, the aggregate information including: a question-answer pair corresponding to each tag of the entity.

According to the method and apparatus for providing an aggregate result of question-and-answer information provided by the present disclosure, the search expression inputted by the user is acquired, and the entity corresponding to the search expression inputted by the user is determined. The aggregate information corresponding to the entity corresponding to the search expression inputted by the user is pushed to the user. The aggregate information includes: the question-answer pair corresponding to the each tag of the entity corresponding to the search expression inputted by the user. When the user searches for information on a given aspect of the entity, the aggregate information containing question-answer pairs on a plurality of aspects of the entity is pushed to the user. Thus, the user may acquire information on the plurality of aspects of the entity.

BRIEF DESCRIPTION OF THE DRAWINGS

After reading detailed descriptions of non-limiting embodiments given with reference to the following accompanying drawings, other characteristics, objectives, and advantages of the present disclosure will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
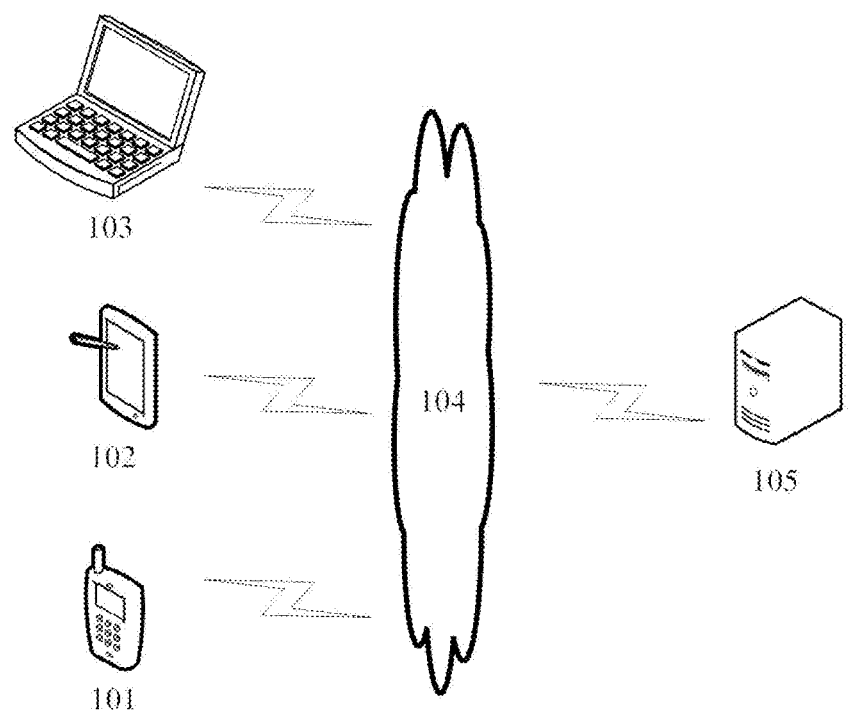
FIG. 1 illustrates an exemplary system architecture on which a method for providing an aggregate result of question-and-answer information according to the present disclosure may be applied.

FIG. 1 shows an illustrative architecture of a system 100 which may be used by a method for providing an aggregate result of question-and-answer information according to the embodiments of the present application.

As shown in FIG. 1, the system architecture 100 may include terminal devices 101, 102, and 103, a network 104 and a server 105. The network 104 serves as a medium providing a communication link between the terminal devices 101, 102, and 103, and the server 105. The network 104 may include various types of connections, such as wired or wireless transmission links, or optical fibers.

The user may use the terminal device 101, 102, or 103 to interact with the server 105 through the network 104, in order to transmit or receive messages, etc. Input method applications and browser applications may be installed on the terminal devices 101, 102, and 103.

The terminal devices 101, 102, and 103 may be various electronic devices having a display and supporting network communication, including but not limited to, smart phones, tablet computers, e-book readers, laptop computers, or desktop computers.

The server 105 may receive a search request sent by the terminal device 101, 102 or 103. The server 105 may push aggregate information corresponding to the entity corresponding to the search expression inputted by a user to the user, the aggregate information including: a question-answer pair corresponding to the entity corresponding to the search expression inputted by the user. The server 105 may also find search results corresponding to the search expression inputted by the user in the search engine, and push the search results corresponding to the search expression inputted by the user in the search engine and the aggregate information to the user.

It should be appreciated that the numbers of the terminal devices, the networks and the servers in FIG. 1 are merely illustrative. Any number of terminal devices, networks and servers may be provided based on the actual requirements.

Figure 2:
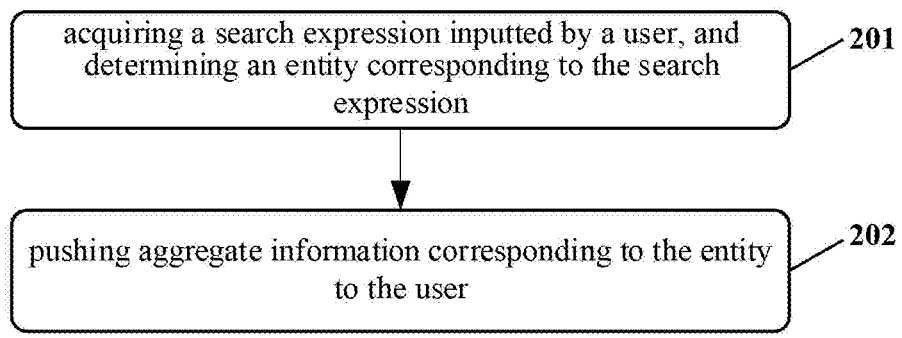
FIG. 2 is a flowchart of an embodiment of the method for providing an aggregate result of question-and-answer information according to the present disclosure.

Referring to FIG. 2, a flow of an embodiment of a method for providing an aggregate result of question-and-answer information according to the present disclosure is shown. It should be noted that the method for providing an aggregate result of question-and-answer information provided by the embodiment of the present disclosure may be performed by a server (for example, the server 105 in FIG. 1). The method includes the following steps.

Step 201, acquiring a search expression inputted by a user, and determining an entity corresponding to the search expression inputted by the user.

In this embodiment, after the user inputs the search expression in a search page, the server may receive the search expression inputted by the user and sent by a terminal of the user. Therefore, the search expression inputted by the user may be acquired. When the user desires to search for information related to an entity, the search expression inputted by the user may be a question related to the entity.

After the search expression inputted by the user is acquired, the entity corresponding to the search expression inputted by the user may be further determined. For example, when it is detected that the search expression inputted by the user contains an entity keyword, it may be determined that the entity corresponding to the search expression inputted by the user is the entity corresponding to the entity keyword. The entity corresponding to the search expression inputted by the user may refer to an object to which the content the user desires to search for belongs.

For example, if the user desires to search for information on symptoms of the diabetes, the object to which the content the user desires to search for belongs is the diabetes, and the diabetes is the entity. The search expression inputted by the user contains a keyword related to the entity, for example, "diabetes."

Step 202, pushing aggregate information corresponding to the entity to the user.

In this embodiment, after the entity corresponding to the search expression inputted by the user is determined in step 201, the aggregate information corresponding to the entity may be determined, and the aggregate information is pushed to the user. The aggregate information includes: a question-answer pair corresponding to each tag of the entity corresponding to the search expression inputted by the user. In addition, search results corresponding to the search expression inputted by the user in the search engine may be found. The search results corresponding to the search expression inputted by the user in the search engine is pushed to the user together with the aggregate information corresponding to the entity.

In this embodiment, one entity may have a plurality of tags. A tag of the entity represents an aspect of the entity. For example, if the entity is the diabetes, tags of the diabetes may include symptom, treatment, and the like.

The question-answer pair corresponding to the tag of the entity contains a question associated with the tag of the entity and an answer to the question. For example, if the tag of the entity is the symptom of the diabetes, one question-answer pair corresponding to the symptom of the diabetes contains one question related to the symptom of the diabetes (for example, "what are the symptoms of the diabetes") and the answer to the question. When the question in the one question-answer pair is associated with the tag of the entity, it may be determined that the question-answer pair corresponds to the tag of the entity.

In this embodiment, a tag of each entity may respectively correspond to a plurality of question-answer pairs. For each tag of the entity, a plurality of question-answer pairs corresponding to the each tag of the entity may be respectively pre-acquired, to obtain aggregate information corresponding to the entity.

Therefore, after the user inputs the search expression, the aggregate information corresponding to the entity corresponding to the search expression inputted by the user may be pushed to the user. The aggregate information includes question-answer pairs corresponding to the each tag of the entity corresponding to the search expression inputted by the user. In other words, the aggregate information contains question-answer pairs on a plurality of aspects of the entity. When the aggregate information is pushed to the user, the respective question-answer pair corresponding to the each tag may be presented to the user at the terminal of the user. Accordingly, the user may acquire information on the plurality of aspects of the entity.

For example, the search expression inputted by the user is "symptoms of diabetes." After the search expression inputted by the user is acquired, it may be determined that the entity corresponding to the search expression inputted by the user is the diabetes. The tags of the diabetes may include the symptom, the treatment, and the like. The plurality of question-answer pairs corresponding to the tags of the entity such as the symptom and the treatment may be respectively pre-acquired, to obtain the aggregate information. Then, the aggregate information is pushed to the user, and the user may obtain information on the symptom, treatment, and the like of the diabetes from the question-answer pairs.

In some alternative implementations of this embodiment, a plurality of question-answer pairs corresponding to the tag of a given entity may be pre-acquired from a plurality of websites. When a question in a question-answer pair acquire from the websites is associated with the tag of the entity, it may be determined that the question-answer pair corresponds to the tag of the entity.

For example, the plurality of websites are all question and answer websites of a medical type, the entity is the diabetes, and the tag of the given entity is the symptom of the diabetes. A questioning user inputs a question corresponding to the tag, the symptom of the diabetes, at a website, and an answering user may input the answer to the question at the website. The question inputted by the questioning user and the answer inputted by the answering user constitute the question-answer pair corresponding to the symptom of the diabetes. A plurality of question-answer pairs corresponding to the symptom of the diabetes may be acquired from a plurality of question and answer websites of the medical type.

After the plurality of question-answer pairs corresponding to the tag of the given entity is pre-acquired from the plurality of websites, the answers in the plurality of question-answer pairs corresponding to the tag of the given entity may be clustered according to semantic similarity between answers in the plurality of question-answer pairs corresponding to the tag of the given entity, to obtain an answer clustering result. The number of the answer clustering result may be more than one. An optimum answer may be respectively selected from each of a plurality of answer clustering results. The question-answer pair to which the selected optimum answer belongs may be used as the question-answer pair corresponding to the tag of the given entity in the aggregate information corresponding to the given entity.

For example, the entity is the diabetes, and the tag of the entity is the symptom of the diabetes. The plurality of question-answer pairs corresponding to the symptom of the diabetes may be pre-acquired from the plurality of question and answer websites of the medical type. The question in each of the plurality of question-answer pairs corresponding to the symptom of the diabetes is a question related to the symptom of the diabetes. According to the semantic similarity between the answers in the plurality of question-answer pairs, the answers in the plurality of question-answer pairs may be clustered, and thus, similar answers may constitute one answer clustering result. After the answers in the plurality of question-answer pairs are clustered, a plurality of answer clustering results may be obtained. Then, an optimum answer may be selected from each of the plurality of answer clustering results. The question-answer pair to which the selected optimum answer belongs is used as the question-answer pair corresponding to the symptom of the diabetes in the aggregate information corresponding to the diabetes.

When the optimum answer is selected from the answer clustering result, the optimum answer may be selected according to a confidence coefficient of the website to which the answer belongs, a confidence coefficient of the answering user to which the answer belongs, comments on the answer, and the like. For example, the website, the answering user to which the answer belongs, and the comments on the answer may be graded in advance, and each grade corresponds to a score. In addition, some scores may be positive or negative. For example, in the comments on the answer, the score of a like is positive, and the score of a dislike is negative.

The score corresponding to the website to which the answer belongs, the score corresponding to the answering user to which the answer belongs, and the score corresponding to the comments on the answer may respectively be used as the confidence coefficient of the website, the confidence coefficient of the answering user to which the answer belongs, and the confidence coefficient of the comments on the answer, which are weighted to obtain the score of the answer, i.e., the confidence coefficient of the answer.

In some alternative implementations of this embodiment, when the aggregate information is pushed to the user, a search result page may be generated and pushed to the user. The search result page includes: initial presentation contents corresponding to the aggregate information. The initial presentation contents include: a tag item respectively representing the each tag of the entity. Each tag item is respectively bound with the question-answer pair corresponding to the tag represented by the tag item. When a preset operation is performed on the tag item, the question-answer pair corresponding to the tag represented by the pre-bound tag item may be presented to the user.

For each tag item in the search result page, it may be respectively bound with the question-answer pair corresponding to the tag represented by the tag item in the aggregate information, the question-answer pair being pushed to the user. After the server pushes the search result page to the user, the search result page may be displayed at the terminal of the user. For example, the search result page is loaded in a browser of the terminal of the user to be presented to the user. Therefore, first, the tag item respectively representing the each tag of the entity corresponding to the search expression inputted by the user is presented to the user, the tag being in the initial presentation contents corresponding to the aggregate information in the search result page. When the preset operation is performed on the each tag item, for example, the user performs a click operation on the tag item, the question-answer pair corresponding to the tag represented by the tag item on which the preset operation is performed may be presented to the user.

For example, the search expression inputted by the user is "symptoms of diabetes," and the entity corresponding to the search expression inputted by the user is the diabetes. The search result page includes: initial presentation contents corresponding to the aggregate information. The initial presentation contents corresponding to the aggregate information includes: tag items respectively representing the tags such as the symptom and the treatment. If the user needs to view a question-answer pair on a certain aspect of the diabetes, the user may click on the respective tag item. Then, the question-answer pair pushed to the user and corresponding to the respective tag item may be presented to the user.

In some alternative implementations of this embodiment, the aggregate information pushed to the user may further include: the website to which the question-answer pair corresponding to the tag of the entity corresponding to the search expression inputted by the user belongs, and user information of the answering user to which the answer in the question-answer pair corresponding to the tag of the entity corresponding to the search expression inputted by the user belongs.

Figure 3:
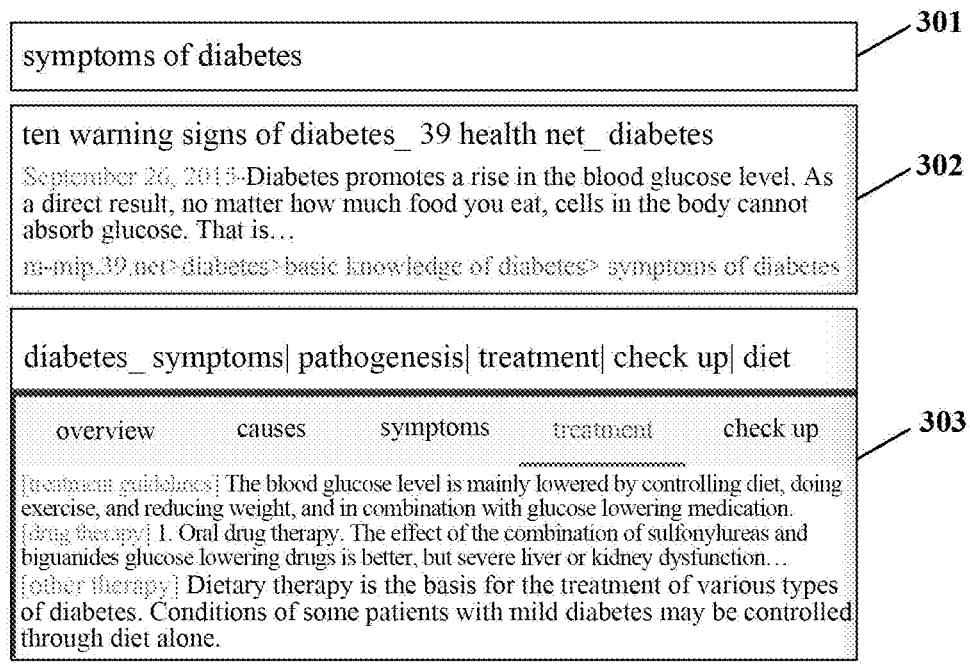
FIG. 3 is a schematic effect diagram of a search result page.

Referring to FIG. 3, a schematic effect diagram of a search result page is shown.

In FIG. 3, the input box 301 of the search engine, the search result 302, and the initial presentation contents 303 corresponding to the aggregate information are shown. The search result 302 may be the search results corresponding to the search expression inputted by the user in the search engine.

The input box 301 contains a search expression "symptoms of diabetes" inputted by the user, and the entity corresponding to the search expression inputted by the user is the diabetes. The initial presentation contents 303 corresponding to the aggregate information includes tag items respectively representing the tags such as the symptom and the treatment.

Figure 4:
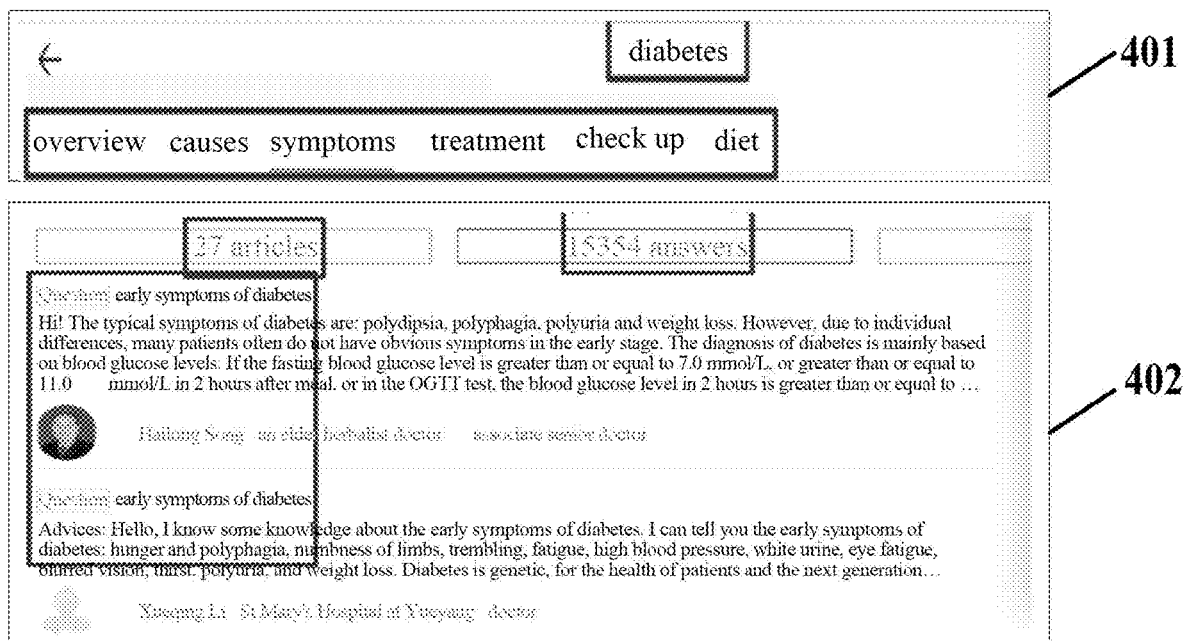
FIG. 4 is a schematic effect diagram of a detail page corresponding to a tag item.

Referring to FIG. 4, a schematic effect diagram of a detail page corresponding to a tag item is shown.

In FIG. 4, the tag item displaying portion 401 and the question-answer pair displaying portion 402 in the detail page are shown.

The search expression inputted by the user is "symptoms of diabetes." The initial presentation contents corresponding to the aggregate information is displayed in the search result page presented to the user, and the initial presentation contents include the tag items representing the tags such the symptom, and the treatment. When the user clicks on the tag item representing the symptom, the detail page corresponding to the tag item may be presented to the user.

The tag item displaying portion 401 in the detail page contains the item representing the entity diabetes, and the tag items representing the tags such the symptom, and the treatment. The question-answer pair displaying portion 402 includes the question-answer pair corresponding to the symptom of the diabetes in the aggregate information, the website to which the answer belongs, and the user information of the answering user to which the question-answer pair belongs.

Figure 5:
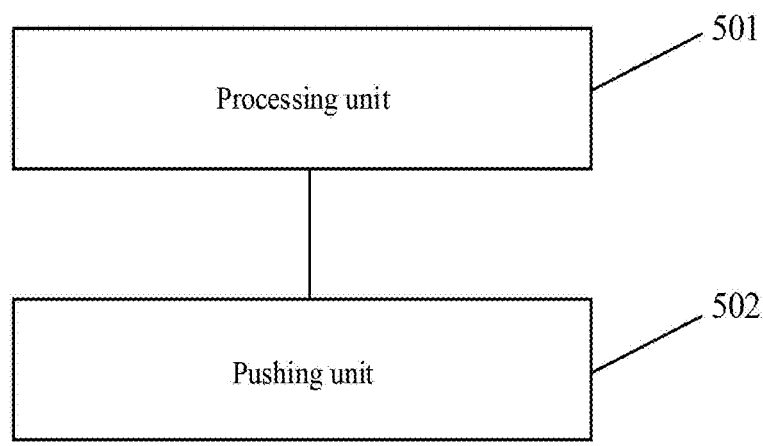
FIG. 5 is a schematic structural diagram of an embodiment of an apparatus for providing an aggregate result of question-and-answer information according to the present disclosure.

Referring to FIG. 5, as an implementation of the method shown in the above figures, the present disclosure provides an embodiment of an apparatus for providing an aggregate result of question-and-answer information. The embodiment of the apparatus corresponds to the embodiment of the method illustrated in FIG. 2.

As shown in FIG. 5, the apparatus for providing an aggregate result of question-and-answer information in this embodiment includes: a processing unit 501, and a pushing unit 502. The processing unit 501 is configured to acquire a search expression inputted by a user, and determine an entity corresponding to the search expression. The pushing unit 502 is configured to push aggregate information corresponding to the entity to the user. The aggregate information includes: a question-answer pair corresponding to each tag of the entity.

In some alternative implementations of this embodiment, the apparatus for providing an aggregate result of question-and-answer information further includes: an aggregation unit. The aggregation unit is configured to acquire a plurality of question-answer pairs corresponding to a tag of a given entity from a plurality of websites, and cluster, according to semantic similarity between answers in the plurality of question-answer pairs corresponding to the tag of the given entity, the answers in the plurality of question-answer pairs corresponding to the tag of the given entity to obtain an answer clustering result; select an optimum answer from the answer clustering result; and use the question-answer pair to which the selected optimum answer belongs as the question-answer pair corresponding to the tag of the given entity.

In some alternative implementations of this embodiment, the aggregation unit is further configured to select the optimum answer from the answer clustering result based on an attribute of an answer in the answer clustering result. The attribute includes: a confidence coefficient of a website to which the answer belongs, a confidence coefficient of an answering user to which the answer belongs, and comments on the answer.

In some alternative implementations of this embodiment, the apparatus for providing an aggregate result of question-and-answer information further includes: a page pushing unit. The page pushing unit is configured to: generate a search result page, wherein the search result page includes initial presentation contents corresponding to the aggregate information, and the initial presentation contents include a tag item respectively representing the each tag of the entity, wherein the tag item is bound with the question-answer pair corresponding to the tag represented by the tag item in the aggregate information, and the question-answer pair corresponding to the tag represented by the tag item is presented to the user when a preset operation is performed on the tag item; and push the search result page to the user.

In some alternative implementations of this embodiment, the aggregate information further includes: the website to which the question-answer pair corresponding to the each tag of the entity belongs, and user information of the answering user to which the answer in the question-answer pair corresponding to the each tag of the entity belongs.

Figure 6:
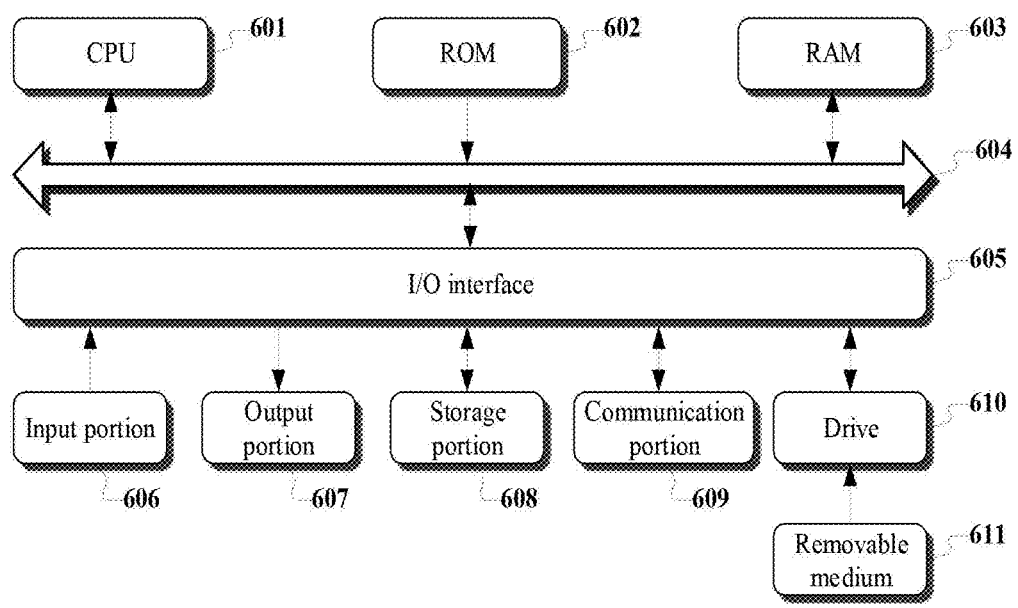
FIG. 6 is a schematic structural diagram of a computer system adapted to implement a server according to embodiments of the present disclosure.

Referring to FIG. 6, a schematic structural diagram of a computer system 600 adapted to implement a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: acquire a search expression inputted by a user, and determine an entity corresponding to the search expression; and push aggregate information corresponding to the entity to the user, the aggregate information including: a question-answer pair corresponding to each tag of the entity.

It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a processing unit and a pushing unit, where the names of these units or modules do not in some cases constitute a limitation to such units or modules themselves. For example, the processing unit may also be described as "a unit for acquiring a search expression inputted by a user, and determining an entity corresponding to the search expression."

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for providing an aggregate result of question-and-answer information, comprising:
    acquiring a plurality of question-answer pairs corresponding to a tag of a given entity from a plurality of websites, and clustering, according to semantic similarity between answers in the plurality of question-answer pairs corresponding to the tag of the given entity, the answers in the plurality of question-answer pairs corresponding to the tag of the given entity to obtain an answer clustering result;
    selecting an optimum answer from the answer clustering result;
    using the question-answer pair to which the selected optimum answer belongs as the question-answer pair corresponding to the tag of the given entity;
    acquiring a search expression inputted by a user, and determining an entity corresponding to the search expression; and
    pushing aggregate information corresponding to the entity corresponding to the search expression to the user, the aggregate information including: a question-answer pair corresponding to each tag of the entity corresponding to the search expression.

2. The method according to claim 1, wherein the selecting an optimum answer from the answer clustering result comprises:
    selecting the optimum answer from the answer clustering result based on an attribute of an answer in the answer clustering result, wherein the attribute includes: a confidence coefficient of a website to which the answer belongs, a confidence coefficient of an answering user to which the answer belongs, and comments on the answer.

3. The method according to claim 2, further comprising:
    generating a search result page, wherein the search result page includes initial presentation contents corresponding to the aggregate information, and the initial presentation contents include a tag item respectively representing the each tag of the entity, wherein the tag item is bound with the question-answer pair corresponding to the tag represented by the tag item in the aggregate information, and the question-answer pair corresponding to the tag represented by the tag item is presented to the user when a preset operation is performed on the tag item; and
    pushing the search result page to the user.

4. The method according to claim 3, wherein the aggregate information further includes: the website to which the question-answer pair corresponding to the each tag of the entity belongs, and user information of the answering user to which the answer in the question-answer pair corresponding to the each tag of the entity belongs.

5. An apparatus for providing an aggregate result of question-and-answer information, comprising:
    at least one processor; and
    a memory storing instructions, the instructions when executed by the at least one processor, cause the at least one processor to perform operations, the operations comprising:
    acquiring a plurality of question-answer pairs corresponding to a tag of a given entity from a plurality of websites, and clustering, according to semantic similarity between answers in the plurality of question-answer pairs corresponding to the tag of the given entity, the answers in the plurality of question-answer pairs corresponding to the tag of the given entity to obtain an answer clustering result;
    selecting an optimum answer from the answer clustering result;
    using the question-answer pair to which the selected optimum answer belongs as the question-answer pair corresponding to the tag of the given entity;
    acquiring a search expression inputted by a user, and determining an entity corresponding to the search expression; and pushing aggregate information corresponding to the entity corresponding to the search expression to the user, the aggregate information including: a question-answer pair corresponding to each tag of the entity corresponding to the search expression.

6. The apparatus according to claim 5, wherein the selecting an optimum answer from the answer clustering result comprises:
selecting the optimum answer from the answer clustering result based on an attribute of an answer in the answer clustering result, wherein the attribute includes: a confidence coefficient of a website to which the answer belongs, a confidence coefficient of an answering user to which the answer belongs, and comments on the answer.

7. The apparatus according to claim 6, further comprising:
generating a search result page, wherein the search result page includes initial presentation contents corresponding to the aggregate information, and the initial presentation contents include a tag item respectively representing the each tag of the entity, wherein the tag item is bound with the question-answer pair corresponding to the tag represented by the tag item in the aggregate information, and the question-answer pair corresponding to the tag represented by the tag item is presented to the user when a preset operation is performed on the tag item; and push the search result page to the user.

8. The apparatus according to claim 7, wherein the aggregate information further includes: the web site to which the question-answer pair corresponding to the each tag of the entity belongs, and user information of the answering user to which the answer in the question-answer pair corresponding to the each tag of the entity belongs.

9. A non-transitory computer-readable storage medium storing a computer program, the computer program when executed by one or more processors, causes the one or more processors to perform operations, the operations comprising:
acquiring a plurality of question-answer pairs corresponding to a tag of a given entity from a plurality of websites, and clustering, according to semantic similarity between answers in the plurality of question-answer pairs corresponding to the tag of the given entity, the answers in the plurality of question-answer pairs corresponding to the tag of the given entity to obtain an answer clustering result;
selecting an optimum answer from the answer clustering result;
using the question-answer pair to which the selected optimum answer belongs as the question-answer pair corresponding to the tag of the given entity;
acquiring a search expression inputted by a user, and determining an entity corresponding to the search expression; and
pushing aggregate information corresponding to the entity corresponding to the search expression to the user, the aggregate information including: a question-answer pair corresponding to each tag of the entity corresponding to the search expression.

\* \* \* \* \*